(No Model.)  4 Sheets—Sheet 1.
J. B. ANDERSON.
TRAVELING CRANE.
No. 495,574.  Patented Apr. 18, 1893.
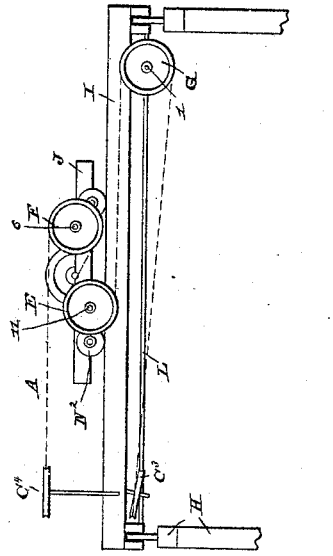
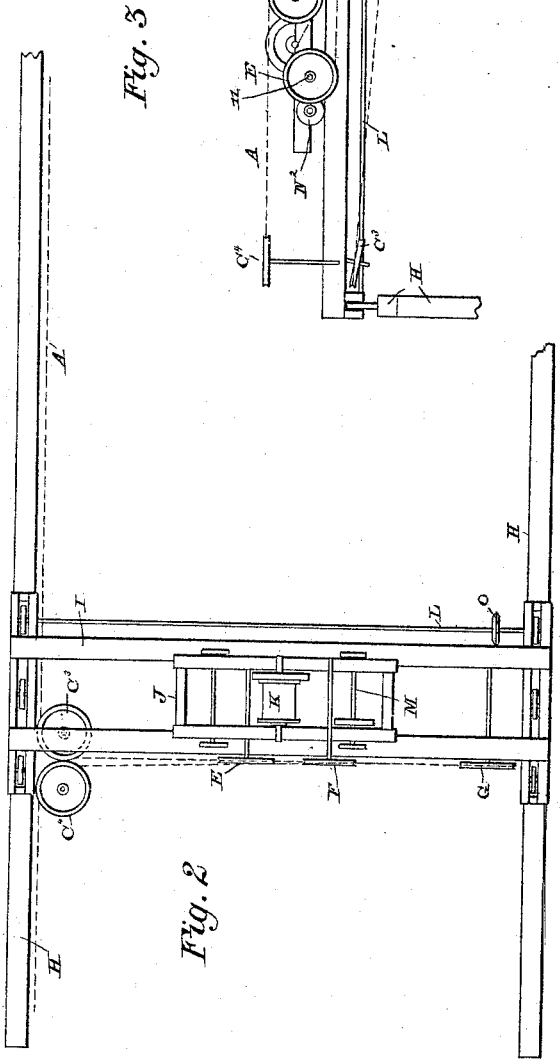
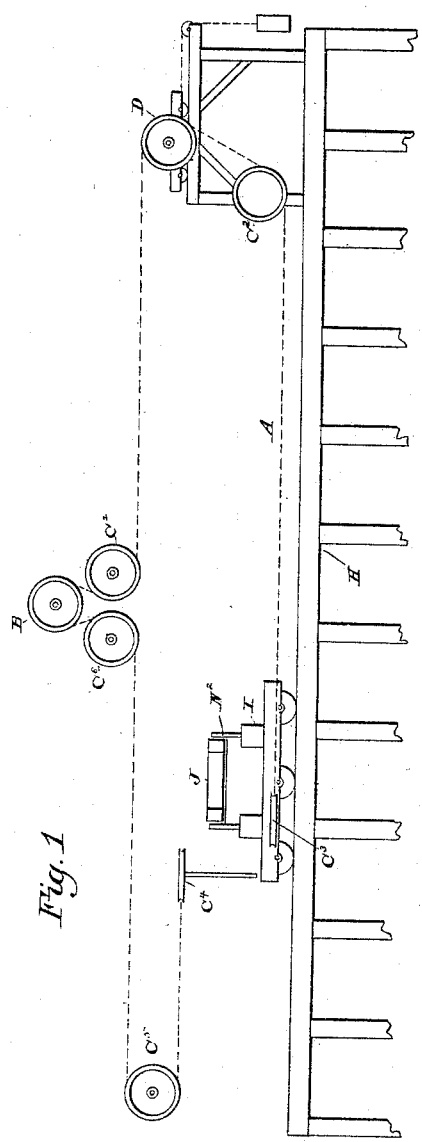
Witnesses
Wm L Boyden
Edw. S. Duvall Jr.
Inventor
John B. Anderson
per Fred E. Tasker
Attorney (No Model.) 4 Sheets—Sheet 2.

J. B. ANDERSON.
TRAVELING CRANE.

No. 495,574. Patented Apr. 18, 1893.

WITNESSES:
Wm L. Boyden
Edw. S. Duvall Jr.

INVENTOR,
John B. Anderson
BY
Fred L. Casker
ATTORNEY.

(No Model.) 4 Sheets—Sheet 3.

J. B. ANDERSON.
TRAVELING CRANE.

No. 495,574. Patented Apr. 18, 1893.

WITNESSES:
Wm L. Boyden
Edw. S. Duvall Jr.

INVENTOR
John B. Anderson
BY
Fred L. Chester
ATTORNEY.

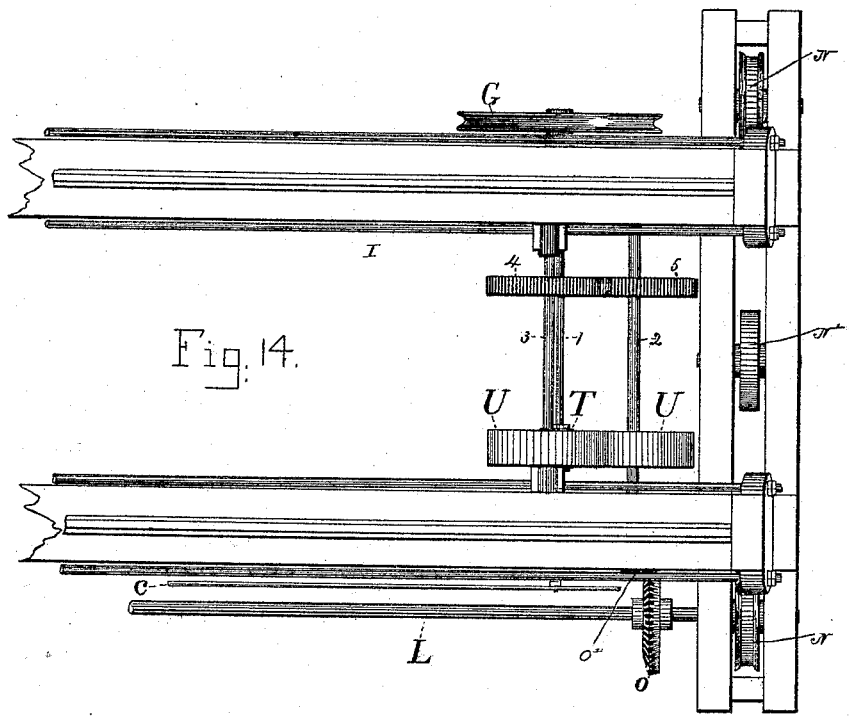

UNITED STATES PATENT OFFICE.

JOHN B. ANDERSON, OF MONTPELIER, VERMONT.

TRAVELING CRANE.

SPECIFICATION forming part of Letters Patent No. 495,574, dated April 18, 1893.

Application filed June 7, 1892. Serial No. 435,905. (No model.)

*To all whom it may concern:*

Be it known that I, JOHN B. ANDERSON, a citizen of the United States, residing at Montpelier, in the county of Washington and State of Vermont, have invented certain new and useful Improvements in Traveling Cranes; and I do hereby declare the following to be a full, clear, and exact description of the invention, such as will enable others skilled in the art to which it appertains to make and use the same.

My present invention relates to an improvement in cranes or derricks and more particularly to that special division of the general class known as traveling cranes, that is to say, those that are locomotive in various ways and adjustable in different directions so that the lifting mechanism may be properly placed at any desired time to discharge its function of lifting, transferring and placing an object in any desired situation, and the invention consists in the construction, arrangement and combination of the various parts of the locomotive mechanism for the lifting mechanism, substantially as will be hereinafter described and claimed.

Figure 4:
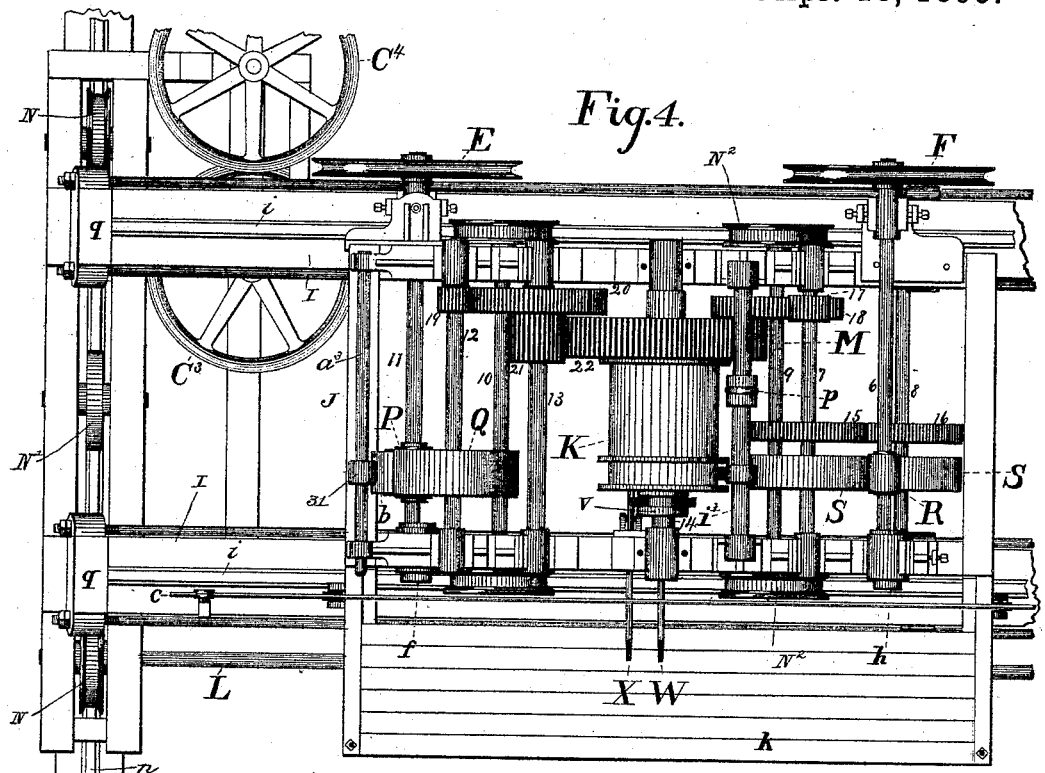
Figure 5:
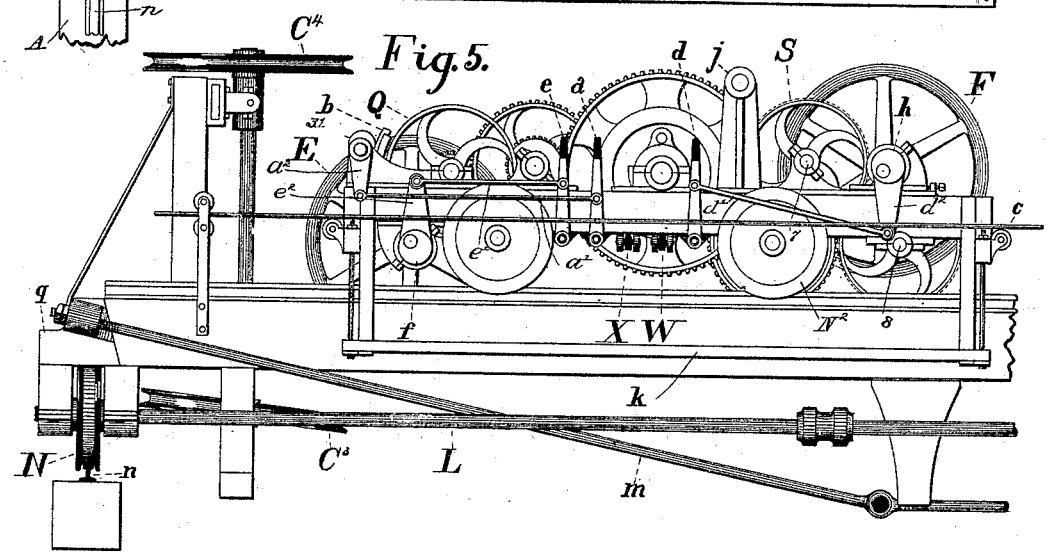
Figure 6:
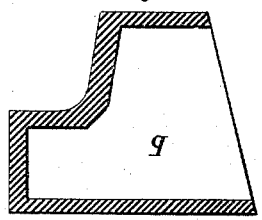
Figure 7:
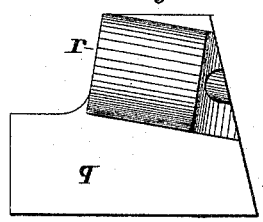
Figure 8:
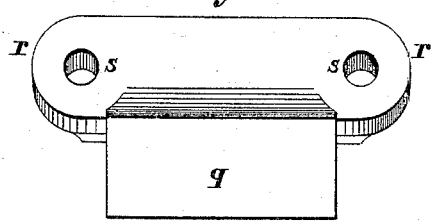
Figure 9:
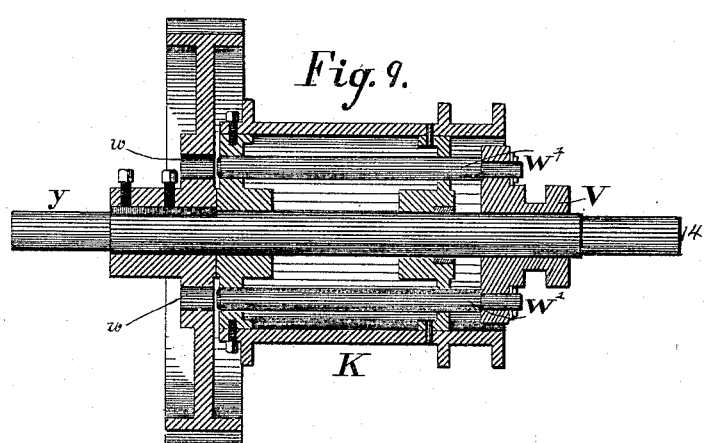
Figure 10:
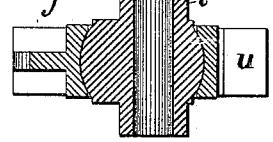
Figure 11:
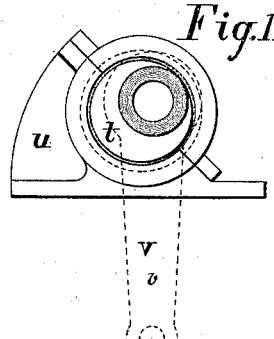
Figure 12:
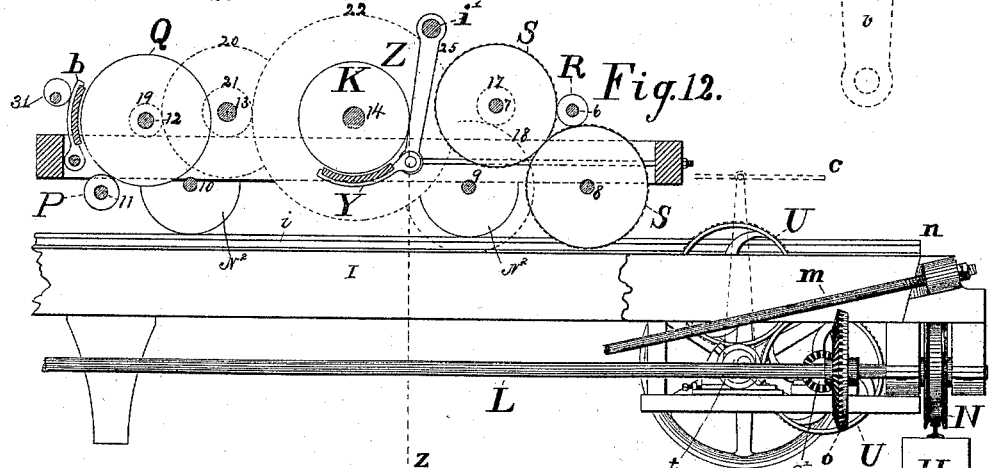
Figure 13:
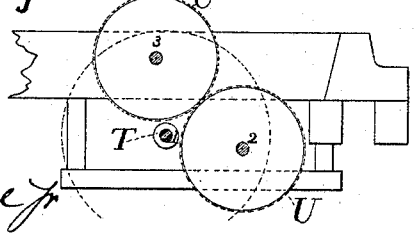

In the annexed drawings illustrating my invention: Figure 1 is an outline or diagrammatic side elevation of the entire mechanism of my improved traveling crane. Fig. 2 is an outline partial plan view of the same. Fig. 3 is an outline side view of the parts shown in Fig. 2. Fig. 4 is an enlarged detail plan view of the two cars and their mechanism. Fig. 5 is a side elevation of the same. Fig. 6 is a sectional detail view of one of the caps for the timber ends to which caps the truss rods are connected. Fig. 7 is an end view of the same. Fig. 8 is an outer side elevation of the same. Fig. 9 is a sectional detail view of the winding drum and its clutch mechanism. Fig. 10 is a sectional view of one of the cam boxes which serve as shaft bearings. Fig. 11 is an end elevation of the same. Fig. 12 is a side elevation showing a part of the mechanism which operates the larger car and indicating in outline a portion of the mechanism of the smaller car. Fig. 13 is a detail outline view showing the two friction wheels and an intermediate friction pulley which determine by their adjustment the direction of motion of the larger car. Fig. 14 is a detail plan view of the same, and other parts which combine in their operation for the same purpose.

Similar letters and numerals of reference designate corresponding parts throughout all the different figures of the drawings.

In my improved traveling crane there are two cars, a larger one, or as I term it, a "long" car, movable upon a track, and a smaller one, or as I term it, a "short" car, movable crosswise or at right angles to the direction of motion of the long car, and running upon a track upon said long car, and there is likewise a lifting mechanism, and the power for actuating these three principal elements of the apparatus is transmitted through one endless rope.

H denotes the two parallel sleepers carrying the rails $n$ $n$ of the track, upon which the long car runs.

I, denotes said long car, and J, the short car, which runs upon the rails $i$ $i$ fixed on the parallel side timbers of the long car. These cars may be of any suitable and desirable form, shape and size. They are generally made simply of a frame properly constructed, to permit the shafts and other parts to be journaled or otherwise arranged therein. In the frame of the long car I, is journaled a shaft L, having the wheels N secured thereon, which wheels engage the rails $n$ $n$. The long car I is further provided at each end with other wheels N′ N′ that also run upon the said track. In the short car J are the shafts 9 and 10, journaled parallel to each other and carrying the wheels $N^2$ that engage the rails $i$ $i$ laid upon the parallel side timbers of the long car.

A designates an endless rope or cable which transmits power to all the elements of my mechanism. I will now trace the course of this rope. It first passes around a drive pulley or sheave B, which is actuated from any suitable source of power, and thence it passes around an idler pulley C′, whence it passes to and around a sheave D supported in a car provided with a weighted rope and acting as a tension device to take up the slack of the rope. The rope passes therefrom downward and around an idler sheave $C^2$, then horizontally to a horizontal sheave $C^3$, whose shaft is suitably supported. From this sheave the rope is applied to the long car, by passing around the pulley G which is fixed on the end of a horizontal shaft 1, which is journaled in car I—see Fig. 14. Rope A passes from pulley G upward around pulley E and then around pulley F, which two pulleys are carried rigidly on the ends of the shafts 11 and 6, respectively, which are journaled horizontally in a transverse position in the short car J. It will be noted here that power is derived from the shaft 1, for the lengthwise travel of the long car, from shaft 11 for the winding drum belonging to the lift, and from shaft 6 for the crosswise travel of the short car. Rope A passes from pulley F to the horizontal idler sheave $C^4$ whose shaft is suitably supported, and thence it passes around sheave $C^5$, then around sheave $C^6$ and back to drive pulley B again.

Each of the shafts 1, 6 and 11 which carry respectively the pulleys G, F and E is supported at one end in a cam box similar to what is shown in detail in Fig. 10.

$t$ denotes the cam box for shaft 1, $h$ the cam box for shaft 6 and $f$ the cam box for shaft 11. The main frame of the cam box is in Figs. 11 and 10, designated $u$. In this frame is the cam box $t$ consisting of a bored casting having an enlargement upon one side so that the bore can be eccentric and formed on the outside with a circular convexity which is seated and rotatable within a concaved recess in the frame $u$, whereby the box is held in place and is revoluble for the purpose of slightly changing the alignment of the shaft which it carries and thereby placing a pinion on said shaft in or out of engagement with one or the other of two contiguous pulleys. Until the position of the shafts is changed, however, they will run idly in their boxes and the rope will run idly through the crane giving no motion except to the sheaves and the shafts to which they are attached.

Referring again to Figs. 10 and 11, the lever $v$ will be noticed by which the cam box is turned or operated in its frame. The end of the shaft is also shown and it will be understood that as the cam is turned, the position of the shaft will be changed from one side of the box to the other.

In Fig. 12 is shown a lever $c$ which is attached to an arm connected to the cam box $t$. By means of this lever the cam in the box $t$ may be turned thereby changing the position of the shaft 1 within it, which shaft we have seen carries the pulley G. On the shaft G is also a paper friction wheel or pulley T—see Figs. 13 and 14.

Parallel to the shaft 1, are two other shafts 2 and 3, likewise supported in the long car I. As the cam bearing for the end of shaft 1 is operated by the lever $c$, or by any other equivalent suitable means that may be devised, the friction pulley T will be brought into contact with one or the other of the large friction wheels U U which are carried on the shafts 2 and 3, in line with pulley T. The shafts 2 and 3 are geared together, there being two intermeshing gears, one of which, gear 4, is on the shaft 3, and the other, gear 5, is on shaft 2. The shaft 2 carries on its outer end a bevel cog pinion $o'$ which engages a bevel cog wheel $o$ on the axle shaft L of the long car which as we have seen has fast thereon the trucks N N. Since the two shafts 2 and 3 are geared together, the axle L will be revolved in one direction when the friction wheel T is brought into contact with one of the wheels U, and the axle L will be revolved in the opposite direction, when the friction wheel T is placed in contact with the other wheel U. Accordingly the car I, travels along its track in one direction or the other by properly shifting the lever which controls the position of the cam bearing for the shaft 1.

The small or short car J is provided with a horizontal platform $k$ upon which the operator stands. In Fig. 4 the small car and its mechanism are fully shown in plan view and in Fig. 5 the same are clearly represented in side elevation. Referring to Fig. 5, we will notice three levers $a, d, e$, which are located in such position as to be conveniently manipulated by the operator standing upon the platform $k$. The lever $d$ has pivoted thereto a link $d'$, the other end of which is pivoted to a lever arm $d^2$ fixed to the cam bearing $h$. Therefore by manipulating the lever $d$, the shaft in the cam bearing $h$ can be turned or changed so as to change the position of the shaft within it, which is shaft 6, having thereon as we have seen the large sheave F, which supplies the power for the crosswise travel of the small car upon the large car. On shaft 6 is also a small friction pulley R. In the frame of the small car J are likewise journaled two parallel shafts 7 and 8. On these shafts are two friction wheels S S, the peripheries of which are contiguous to the friction wheel R and adapted to be in contact therewith. Since the shaft 6 is adjustable in consequence of one end thereof being supported in a cam bearing, the friction wheel R may be at one time placed in contact with one wheel S and at another time in contact with the other wheel S. The two shafts 7 and 8 are geared together, a gear wheel 15 being secured on shaft 7 and a gear wheel 16 being secured upon shaft 8, which gears intermesh with each other. On the shaft 9 which we have already seen is one of the axles of the small car is a gear wheel 17 which engages a pinion 18 on the shaft 7. Therefore it will be seen that power is transmitted from the sheave or pulley F through shaft 6 and the described gearing to the axle 9 and the wheels of the small car and said car is in this way actuated and driven in one direction or the other, its direction of motion being dependent upon which of the two wheels S, the wheel R may be placed in contact with. Accordingly the operator by manipulating the lever $d$ may cause the short car to travel in either direction which he wishes.

The lever handle e which is shown in Fig. 5 has pivoted thereto a link e', the other end of which is pivotally attached to a lever arm $e^2$ which is secured to the cam box f, which contains the shaft 11 that carries the large sheave or pulley E, through which power is applied to the winding drum for the purpose of actuating the lifting mechanism. On the shaft 11 is also a friction wheel P. In the frame of the small car adjacent to shaft 11 are two other parallel shafts 12 and 13. The shaft 12 carries a friction wheel Q, the periphery of which is close to the periphery of the friction wheel P. The friction wheel P may be in contact with friction wheel Q or not as the case may be, its position being dependent upon the adjustment of the shaft 11 in its cam bearing. When friction wheel P is in contact with the larger friction wheel Q, it will be evident that power will be transmitted to said wheel Q. On the shaft 12 is a cogged pinion 19 which meshes with a gear wheel 20 on the shaft 13. Shaft 13 has likewise mounted thereon a cogged pinion 21 which engages the gear wheel 22 on the shaft y, said gear being connected or not to the winding drum K accordingly as it is in or out of clutch therewith. Therefore through this train of gearing which I have just described, the rope drum K receives motion and is revolved thereby lifting the weight to which the rope which is wound thereon, is attached. In the drawings I have not thought it necessary to show said rope or to indicate the other parts of the lifting mechanism besides the winding drum inasmuch as said mechanism constitutes no part of my present invention. Any suitable and desired lifting mechanism may be applied in connection with the drum K.

Referring again to Fig. 5 and observing the lever handle a shown therein, it will be noted that said handle has pivoted thereto a link a', the other end of which is pivoted to a lever $a^2$ which is attached to a shaft $a^3$ having thereon a cam 31 which operates against a pivoted friction brake shoe b and thrusts the same when desired against the periphery of the friction wheel Q, thereby preventing the same from revolving and this of course will hold the load suspended from the rope which is wound upon the rope drum. Here then is provided a friction brake by means of which the operator is enabled to control the load at all times and to gently lower it and to stop or start it at any point. Further it may be again stated that the operator as he stands upon the platform K with the three levers, a e d close to him and easy to be manipulated, can readily control the action of the various parts at all times in the manner and for the purposes which I have already fully described. He can apply the power through lever c so as to regulate lengthwise travel of the long or larger car and he can also control the crosswise travel of the smaller car as well as the action of the lifting mechanism which latter is at all times under his immediate and careful attention. Each of these various travels or motions as well as the lifting can be accomplished or produced separately or any or all of them at the same time, according to the necessities of the case and the desire of the operator. In this way the weight can be taken up at any point between the parallel tracks upon which the long car runs and can be carried and deposited at any other point between those tracks and in its passage between these points it can be raised or lowered or carried either to the right or to the left as may be desired, thereby avoiding the obstructions or the work in progress between the rails of the track. These results are thus produced through power supplied by a single endless rope operating in conjunction with the various shafts or pulleys which supply power to the different elements of the apparatus as has already been fully explained.

In Fig. 4 i' designates what I term a hitching back bar. It is supported in the uprights j j which are mounted on the main frame of the small car. When a very large load is to be lifted, the lifting rope can be passed through a block having one or more falls and the end hooked over this hitching back bar at the point p (see Fig. 4) and in this way the power applied to the load is increased in the same manner as it is with any set of tackle blocks.

Referring to Fig. 9 it will be seen that I have devised a clutch mechanism for connecting or disconnecting the drum K with the gear wheel 22. In Fig. 4 is shown a clutch lever W. This operates the sleeve V which slides upon the shaft 14 and to which are connected the rods W' W' which slide through perforations in the vertical diaphragms located and secured inside of the drum K and said rods W' are adapted to enter the perforations w w formed in the body of the gear wheel 22. Manifestly when the rods W' are in said perforations the drum will be connected to the gear and will revolve therewith and when said rods have been withdrawn from the perforations w then the drum will be disconnected from the gear wheel. In this way therefore the drum is under the control of the operator at all times and when it is desired to unwind the rope quickly the drum and the gear can be easily disconnected by a simple operation of the clutch lever W, the result of which will be to cause the drum K to revolve loosely upon the shaft permitting the rope to unwind by its own weight or to be pulled down as fast as may be desired. On the hitching back bar i'—see Figs. 4 and 12—is supported a hanger 25 and to the lower end of said hanger is pivotally attached a brake shoe Y. A lever X, shown in Fig. 4, is arranged to operate this brake shoe, so that by moving the lever X said shoe may be brought against the rope drum thereby braking the same or causing it to stop or lessen its speed whenever the rope has been unwound as far as is desired.

In the practical construction of my improved crane it has been found that the truss rods m of the long car if permitted to extend past the ends of the side timbers of said car and to be fastened in the manner in which such rods are usually secured, would project uncomfortably far beyond the end of the car. I have therefore devised hollow iron caps to be secured upon the ends of the timbers, in which caps the ends of the truss rods are secured in such a manner as to prevent them projecting beyond the ends of the timbers. The detailed construction of these caps is shown clearly in Figs. 6, 7 and 8. They consist of hollow castings which fit upon the ends of the timbers and have a lower part which projects outwardly considerably farther than the upper part which latter is made angular and shaped in such a manner as to be located a short distance from the extreme outer face of the lower portion.

$q$ designates the hollow metallic cap. At each end thereof are the enlargements $r\ r$ which are provided with the perforations $s\ s$ through which the tie bolts or truss rods $m$ pass having on their ends securing nuts by which they are firmly clamped and held in position. This construction permits the ends of the truss rods to be so located that they will not project beyond the ends of the timbers and allows the crane to be run much nearer the side of the building than would otherwise be possible.

Many changes may be made in the detailed construction of the various parts of my improved traveling crane and many modifications may be devised and employed in lieu of the specific details which are herein described and shown, without departing from the broad lines of the invention which are susceptible of the many variations in actual practice which experience will probably suggest from time to time in the practical employment of the invention.

Having thus described my invention, what I claim as new, and desire to secure by Letters Patent, is—

1. In a crane, the combination of a car, a second car supported and movable thereon in a direction at right angles to the direction of motion of the first car, a winding drum carried by the second car, a shaft having a sheave thereon and journaled in the first car, said shaft being designed to transmit motion to operate said car, two shafts having each a sheave thereon which shafts are journaled in the second car, one of which transmits motion to actuate said car while the other transmits motion to actuate the winding drum, and the endless rope or cable passing around these several sheaves and around other motor sheaves so that the entire apparatus may be actuated by said single rope, substantially as described.

2. In a traveling crane mechanism, the combination of a car movable upon its track, the second car supported and movable upon the first car in a direction at right angles to the direction of motion of the first car, a winding drum on the second car, two sheave-carrying shafts journaled in the second car and one sheave-carrying shaft journaled in the first car, each of said shafts being supported at one end in cam bearings and mechanism for adjusting said shafts so that the cars may move in one direction or the other as the case may be together with other mechanism for actuating the said cars which mechanism includes an endless rope that passes around the several sheaves and transmits motion to all the parts of the apparatus, substantially as described.

3. In a traveling crane mechanism, a movable car, a winding drum supported therein, two sheave-carrying shafts likewise journaled in the said car, one of which shafts transmits motion to move the car while the other transmits motion to actuate the drum and each of said shafts having one of its ends supported in cam bearings and the endless rope, substantially as described.

4. In a crane mechanism, the combination of a car, a winding drum journaled therein, two sheave-carrying shafts likewise journaled in said car, two inter-geared shafts contiguous to one of the sheave-carrying shafts and adapted to be operatively engaged thereby one of which intergeared shafts is geared to one of the axles of the car and two other inter-geared shafts contiguous to the other sheave-carrying shafts, one of which shafts has its gear meshing with the drum gear while the other carries a friction wheel into contact with which a friction wheel on the adjacent sheave-carrying shaft comes in contact, substantially as described.

5. In a crane mechanism, the car, the axles 9 and 10 thereof which are suitably journaled and provided with the wheels $N^2$, the winding drum K journaled in the car, the sheave-carrying shafts 6 and 11 likewise journaled in the car and each being provided at one of its ends with a cam bearing, said shaft 6 carrying the friction wheel R and said shaft 11 carrying friction wheel P, the sheave E on the end of shaft 11 and the sheave F on the end of shaft 6, the parallel shafts 7 and 8, which are geared together, said shaft 7 being geared to axle 9 and said shafts 7 and 8 carrying friction wheels S S into contact with one or the other of which the friction wheel R is placed, the shafts 12 and 13 journaled in the car, said shafts being geared together and the shaft 13 being geared to the drum the friction wheel Q on shaft 12 into contact with which wheel the friction wheel P is adapted to be placed, mechanism for adjusting the position of the cam bearings of the shafts 6 and 11 and mechanism for transmitting motion to the sheaves E and F for the purpose of moving the car and actuating the lifting mechanism, substantially as described.

6. In a crane mechanism, the combination of a car I moving on its track, a car J supported and movable upon the car I, in a direction at right angles to the direction of motion of the car I, a shaft 1 journaled in car I and carrying sheave G, shafts 6 and 11 journaled in car J and carrying sheaves F and E respectively, the axle L journaled in car I, shafts 2 and 3 carrying friction wheels U U, said shafts being journaled in car I and geared together and shaft 2 being geared to axle L, cam bearings for one end of each of the shafts 1, 6 and 11, gearing connections between the shafts 6 and one of the axles of car J, so that motion may be transmitted from shaft 6 to drive car J in either direction, gearing connections between shaft 11 and the winding drum which is supported in car J so that said winding drum may be driven therefrom and an endless rope or cable for transmitting motion to sheaves E and F and G, substantially as described.

7. In a traveling crane apparatus, the combination of the large car I which moves upon its rails, the small car J which moves upon the rails upon the large car I, the winding drum K supported in the car J, the motor sheave B, idle sheaves $c'$ and $c^6$ contiguous thereto, tensioned sheave D, idle shaft $C^2$ idle sheaves $C^3$, $C^4$ and $C^5$, all of said sheaves being suitably supported and arranged and the endless rope or cable passing around all of said sheaves as also around sheaves E and F the shafts carrying said sheaves which shafts are journaled on the small car and sheave G carried by shafts journaled on the large car, substantially as described.

In testimony whereof I affix my signature in presence of two witnesses.

JOHN B. ANDERSON.

Witnesses:
CLARENCE H. PITKIN,
HIRAM CORRLETON.